United States Patent
Ide (10) Patent No.: US 11,502,548 B2
(45) Date of Patent: Nov. 15, 2022

(54) CONTROL SYSTEM AND CONTROL METHOD

(71) Applicant: CANON KABUSHIKI KAISHA, Tokyo (JP)

(72) Inventor: Takeshi Ide, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/877,281

(22) Filed: May 18, 2020

(65) Prior Publication Data

US 2020/0373787 A1 Nov. 26, 2020

(30) Foreign Application Priority Data

May 23, 2019 (JP) .............................. JP2019-097072

(51) Int. Cl.
*H02J 50/12* (2016.01)
*H02J 50/80* (2016.01)
*H02J 50/90* (2016.01)

(52) U.S. Cl.
CPC .............. *H02J 50/12* (2016.02); *H02J 50/80* (2016.02); *H02J 50/90* (2016.02)

(58) Field of Classification Search
CPC . H02J 50/12; H02J 50/80; H02J 50/90; G03F 7/70758; G03F 7/70691
See application file for complete search history.

(56) References Cited

U.S. PATENT DOCUMENTS

| | | | | |
|---|---|---|---|---|
| 6,490,178 B1 * | 12/2002 | Asayama | .......... | H02M 3/33561 363/91 |
| 9,331,576 B2 * | 5/2016 | Williams | ............ | H02M 3/1584 |
| 9,731,614 B1 * | 8/2017 | Sarwat | .................... | H02J 7/025 |
| 2008/0035621 A1 * | 2/2008 | Veik | ...................... | B23K 9/1068 219/130.1 |
| 2010/0068998 A1 * | 3/2010 | Zyambo | .................. | H02J 50/80 455/66.1 |
| 2010/0254379 A1 * | 10/2010 | Fukuda | ................ | H04B 5/0075 370/389 |
| 2013/0026953 A1 * | 1/2013 | Woytowitz | ........... | H05B 47/185 315/312 |

(Continued)

FOREIGN PATENT DOCUMENTS

| | | |
|---|---|---|
| CN | 106716779 A | 5/2017 |
| CN | 107554317 A | 1/2018 |
| JP | 6219495 B2 | 10/2017 |

*Primary Examiner* — Pinping Sun
(74) *Attorney, Agent, or Firm* — Canon U.S.A., Inc. IP Division (57) ABSTRACT

A control system is provided that includes a power transmitting coil for wirelessly transmitting power supplied from a power source, a power receiving coil for wirelessly receiving power by electromagnetic coupling between the power transmitting coil and the power receiving coil, a driving circuit configured to drive a load portion using the power received via the power receiving coil, a transmitting coupler for wirelessly transmitting a transmission signal for controlling driving of the load portion, a receiving coupler for wirelessly receiving the transmission signal by electromagnetic coupling between the transmitting coupler and the receiving coupler, and a generation circuit configured to generate a driving signal for controlling the driving circuit from the transmission signal received via the receiving coupler.

12 Claims, 6 Drawing Sheets

(56) References Cited

U.S. PATENT DOCUMENTS

| | | | | |
|---|---|---|---|---|
| 2013/0063994 A1* | 3/2013 | Alexander | ............ | H02M 5/225 |
| | | | | 363/123 |
| 2013/0188404 A1* | 7/2013 | Nakamura | ............ | H02M 5/297 |
| | | | | 363/37 |
| 2013/0207482 A1* | 8/2013 | Madawala | ............. | H02J 50/12 |
| | | | | 307/104 |
| 2014/0183972 A1* | 7/2014 | Endo | .................... | H04B 5/0075 |
| | | | | 307/104 |
| 2015/0145345 A1* | 5/2015 | Long | ....................... | H02J 50/12 |
| | | | | 307/104 |
| 2015/0357907 A1* | 12/2015 | Koo | ........................ | H02M 5/12 |
| | | | | 363/126 |
| 2016/0164346 A1* | 6/2016 | Zhang | .................... | H02J 50/12 |
| | | | | 307/104 |
| 2017/0008385 A1* | 1/2017 | Fujimoto | ............. | B60K 7/0007 |
| 2017/0207706 A1* | 7/2017 | Hosotani | ................. | H02J 50/80 |
| 2017/0267110 A1* | 9/2017 | Widmer | ................ | B60L 53/122 |
| 2017/0272231 A1* | 9/2017 | Chen | ................... | H04L 25/14 |
| 2017/0279315 A1* | 9/2017 | Sakata | .............. | H02M 7/53871 |
| 2019/0252921 A1* | 8/2019 | Lethellier | ............... | H01F 27/30 |

\* cited by examiner

CONTROL SYSTEM AND CONTROL METHOD

BACKGROUND OF THE INVENTION

Field of the Invention

The present disclosure relates to a control system that performs control based on wireless communication.

Description of the Related Art

Conventionally, there are systems that supply power to and drive motors. In a semiconductor exposure device, a motor that moves wafers by a very small amount in order to form patterns on the wafers is installed on a stage for moving the wafers to an exposure position, and a power supply cable that supplies power for driving the motor is connected to the stage. This cable also moves as the stage moves, and thus, the tension of this cable influences the positioning accuracy of the stage. In view of this, consideration is being given to achieving wireless driving of a motor to remove the need for a power supply cable.

As a technique for achieving wireless driving of a motor, Japanese Patent No. 6219495 discloses a configuration of a motor system that wirelessly drives a wheel of a vehicle. In this motor system, not only is power for driving a motor transmitted wirelessly, but a control signal is also transmitted to a motor driving circuit provided on a power-receiving side (movable side) by using wireless communication utilizing electromagnetic waves, and control of the motor driving circuit is thereby realized. Furthermore, in order to deal with the influence of a delay that occurs when wireless communication utilizing electromagnetic waves is performed, a detection circuit for detecting the driving current and driving voltage is provided on the power-receiving side and feedback control is performed based on detected values, and control of a rectification circuit is thereby realized.

In recent years, there has been a demand to increase the speed of wireless communication of a control signal for driving a load portion, such as a motor. In order to increase precision and exposure speed in a semiconductor exposure device for example, a control signal for driving the motor needs to be transmitted at a shorter cycle. In the technique disclosed in Japanese Patent No. 6219495, it can be expected that a delay of several hundred µs to several ms will occur due to protocol processing, etc., because radiative wireless communication utilizing electromagnetic waves is performed in accordance with a standard of wireless LAN, etc.

SUMMARY OF THE INVENTION

According to various embodiments of the present disclosure, a control system is provided, which includes: a power transmitting coil for wirelessly transmitting power supplied from a power source; a power receiving coil for wirelessly receiving power by electromagnetic coupling between the power transmitting coil and the power receiving coil; a driving circuit configured to drive a load portion using the power received via the power receiving coil; a transmitting coupler for wirelessly transmitting a transmission signal for controlling the load portion; a receiving coupler for wirelessly receiving the transmission signal by electromagnetic coupling between the transmitting coupler and the receiving coupler; and a generation circuit configured to generate a driving signal for controlling the driving circuit from the transmission signal received via the receiving coupler.

Further features of the present disclosure will become apparent from the following description of exemplary embodiments (with reference to the attached drawings).

DESCRIPTION OF THE EMBODIMENTS

Hereinafter, embodiments of the present disclosure will be described in detail with reference to the attached drawings. Note that the following described embodiments are not intended to limit the scope of the present disclosure. Multiple features are described in the embodiments, but the present disclosure is not limited, for example, to embodiments that require all such features, and multiple such features may be combined as appropriate. Furthermore, note that, in the attached drawings, the same reference numerals are given to the same or similar configurations, and redundant description thereof has been omitted.

First Embodiment

Figure 1:
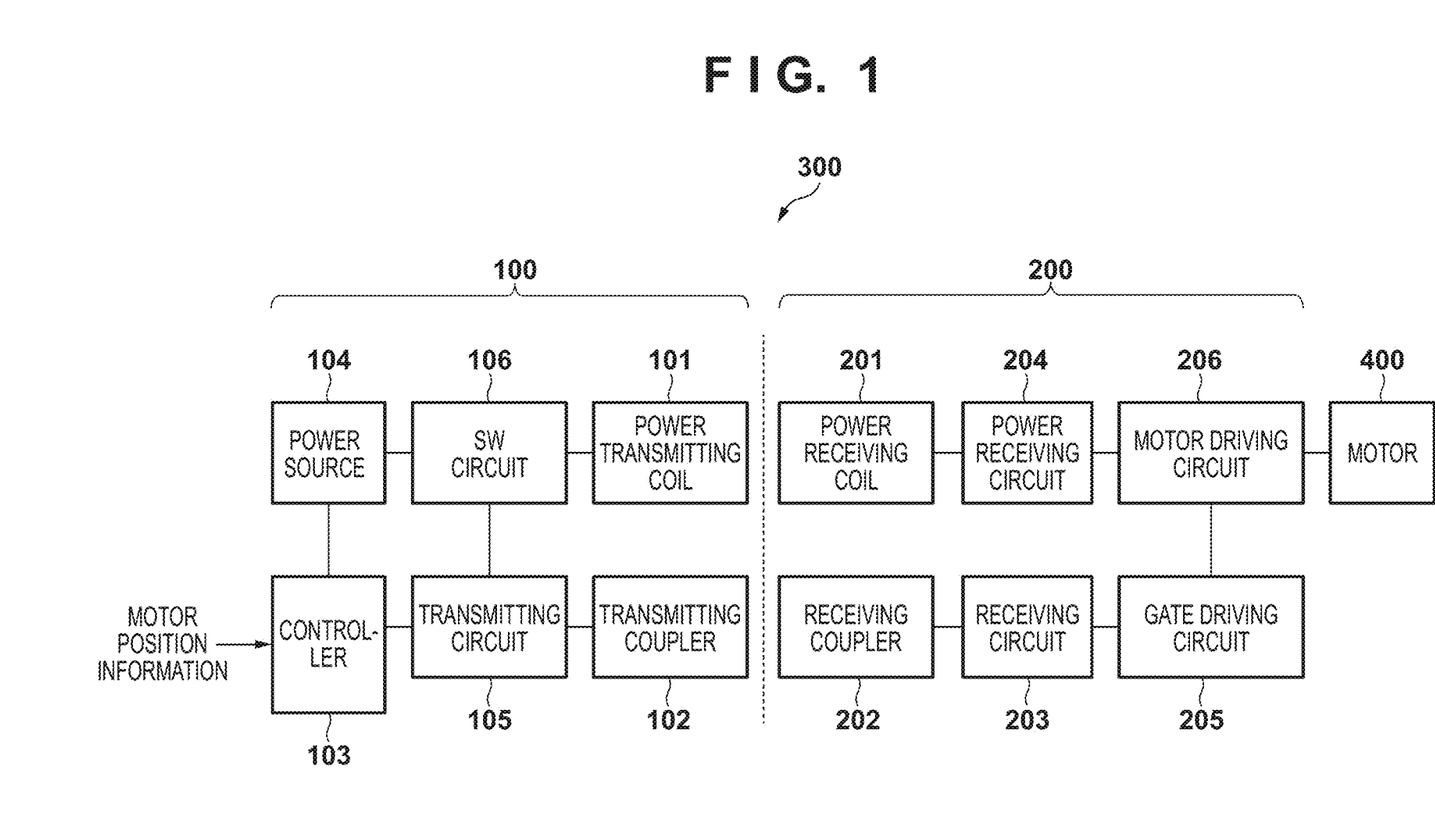
FIG. 1 is a circuit block diagram of a driving system according to one embodiment.

FIG. 1 illustrates a block configuration of circuits of a driving system 300, which functions as a control system, according to the first embodiment. The driving system 300 is constituted by a power transmitting-side circuit 100 and a power receiving-side circuit 200. The power transmitting-side circuit 100 and the power receiving-side circuit 200 are not physically connected. Power is transmitted in a contactless manner from a power transmitting coil 101 to a power receiving coil 201, and control signals are transmitted in a contactless manner from a transmitting coupler 102 to a receiving coupler 202.

A power source 104 is a power source that drives a motor 400, which is a load portion. A controller 103, based on the current position information of the motor 400, which can be obtained from an optical sensor, etc., issues commands regarding the next position. Specifically, the controller 103 issues a command for an output voltage amplitude value of the power source 104 that determines the thrust of the motor 400, and a command for a motor application voltage sign that determines the direction in which the motor 400 moves. The power source 104 receives the command for the output voltage amplitude value from the controller 103, and outputs a voltage having an amplitude value based on the command. The command for the motor application voltage sign (sign switching signal) is transmitted from the controller 103 to a gate driving circuit 205 via a transmitting circuit 105, the transmitting coupler 102, the receiving coupler 202, and a receiving circuit 203. The rectification operation of a motor driving circuit 206 is inverted by 180° as described in the following by the sign switching signal, and the sign of the voltage applied to the motor 400 is inverted from positive to negative or from negative to positive.

Operation of Driving System 300 for Application of Positive Voltage to Motor

First, an example of an operation of the driving system 300 for applying a positive voltage to the motor 400 will be described in detail. The power source 104 having received the command for the output voltage amplitude value from the controller 103 outputs a voltage having an amplitude value based on the command (power source output voltage) to an SW circuit 106. The SW circuit 106 includes a generator that generates a clock signal of a predetermined frequency, and functions as a converter circuit that performs switching on the input power source output voltage (DC voltage) by driving a switching element included in the SW circuit 106 according to the generated clock signal, and converts the power source output voltage (DC voltage) into an AC waveform (AC voltage). The switching frequency is higher than the command frequency of the controller 103, i.e., the motor control frequency. Note that the clock signal may be generated by the controller 103 and supplied to the SW circuit 106.

Then, the power output from the SW circuit 106 is transmitted to the power transmitting coil 101, and is transmitted via the electromagnetic coupling between the power transmitting coil 101 and the power receiving coil 201 and input to a power receiving circuit 204. Here, the SW circuit 106 and the power receiving circuit 204 are formed from resonance power source circuits including an inductor and a capacitor. The element values of the resonance power source circuits are determined according to inductance values and resistance values of the power transmitting coil 101 and the power receiving coil 201, the coupling coefficient of the power transmitting coil 101 and the power receiving coil 201, the switching frequency, the maximum power source output voltage value, the maximum motor application voltage value (voltage value applied to the motor 400), and the resistance value of the motor 400. The power source output voltage value and the motor application voltage value change each time depending on the command from the controller 103. Thus, the element values of the resonance power source circuits can be adjusted so that the power source output voltage value and the motor application voltage value are substantially equal within a voltage range that is determined beforehand in accordance with the use. Furthermore, the motor 400 can be driven with high accuracy by adopting a configuration such that the relationship between the power source output voltage value and the motor application voltage value is measured in advance and made into a table, and a command is issued for the power source output voltage value for obtaining the desired motor application voltage value.

The electromagnetic coupling in the present embodiment includes both electric field coupling and magnetic field coupling. That is, the wireless power transmission may be performed via electric field coupling, via magnetic field coupling, or via both electric field coupling and magnetic field coupling. Magnetic field coupling includes electromagnetic induction and magnetic resonance. Also, the wireless power transmission may be performed according to a method utilizing microwaves. Note that, in the present embodiment, a case in which wireless power transmission utilizing magnetic field coupling is performed will be mainly described.

The clock signal generated by the SW circuit 106 is also used for synchronous rectification by the motor driving circuit 206. The clock signal output from the SW circuit 106 and the sign switching signal output from the controller 103 are input to the transmitting circuit 105, and signals for transmission with adjusted phase and amplitude are generated. Then, the transmission signals are input to the transmitting coupler 102. Note that the transmitting circuit 105 may generate a transmission signal from either the clock signal or the sign switching signal. The phase is adjusted in order to adjust the timing of synchronous rectification, and the amplitude is adjusted for reproduction by the receiving circuit 203. Then, the transmission signals are transmitted to the receiving coupler 202 via the electromagnetic coupling between the transmitting coupler 102 and the receiving coupler 202, and are input to the receiving circuit 203. The clock signal is transmitted in a streaming-like manner via the electromagnetic coupling. Thus, a delay that would occur in wireless communication such as that in which packets are transmitted does not occur, and high-speed signal transmission can be performed. The receiving circuit 203 reproduces the clock signal from a signal received by the receiving coupler 202. The reproduced clock signal is input to the gate driving circuit 205, and drives a synchronous rectification circuit 207 (FIG. 2) of the motor driving circuit 206. The accuracy of motor control is increased by providing a synchronous rectification circuit because even a small voltage of several mV that cannot be rectified by a diode can be rectified and a small voltage can be applied to a motor. The motor driving circuit 206 rectifies the AC waveform output from the power receiving circuit 204, and then determines the sign of the output voltage and applies the output voltage to the motor 400.

The wireless communication between the transmitting coupler 102 and the receiving coupler 202 may be performed via electric field coupling, via magnetic field coupling, or via both electric field coupling and magnetic field coupling. The wireless communication in the present embodiment, which is performed via electromagnetic coupling, differs from radiative communication methods utilizing far-field electromagnetic waves as the transmission medium, and is a non-radiative communication method utilizing a near electromagnetic field as the transmission medium. Note that, in the present embodiment, electric signals are wirelessly transmitted between the transmitting coupler 102 and the receiving coupler 202 according to a baseband method. According to the baseband method, the modulation and demodulation of electric signals are not necessary, and thus, the circuit scale can be reduced and communication can be performed with little delay. However, the communication method is not limited to this, and for example, carrier communication may be performed by modulating a carrier wave transmitted from the transmitting coupler 102 to the receiving coupler 202 using a control signal or a clock signal.

Figure 2:
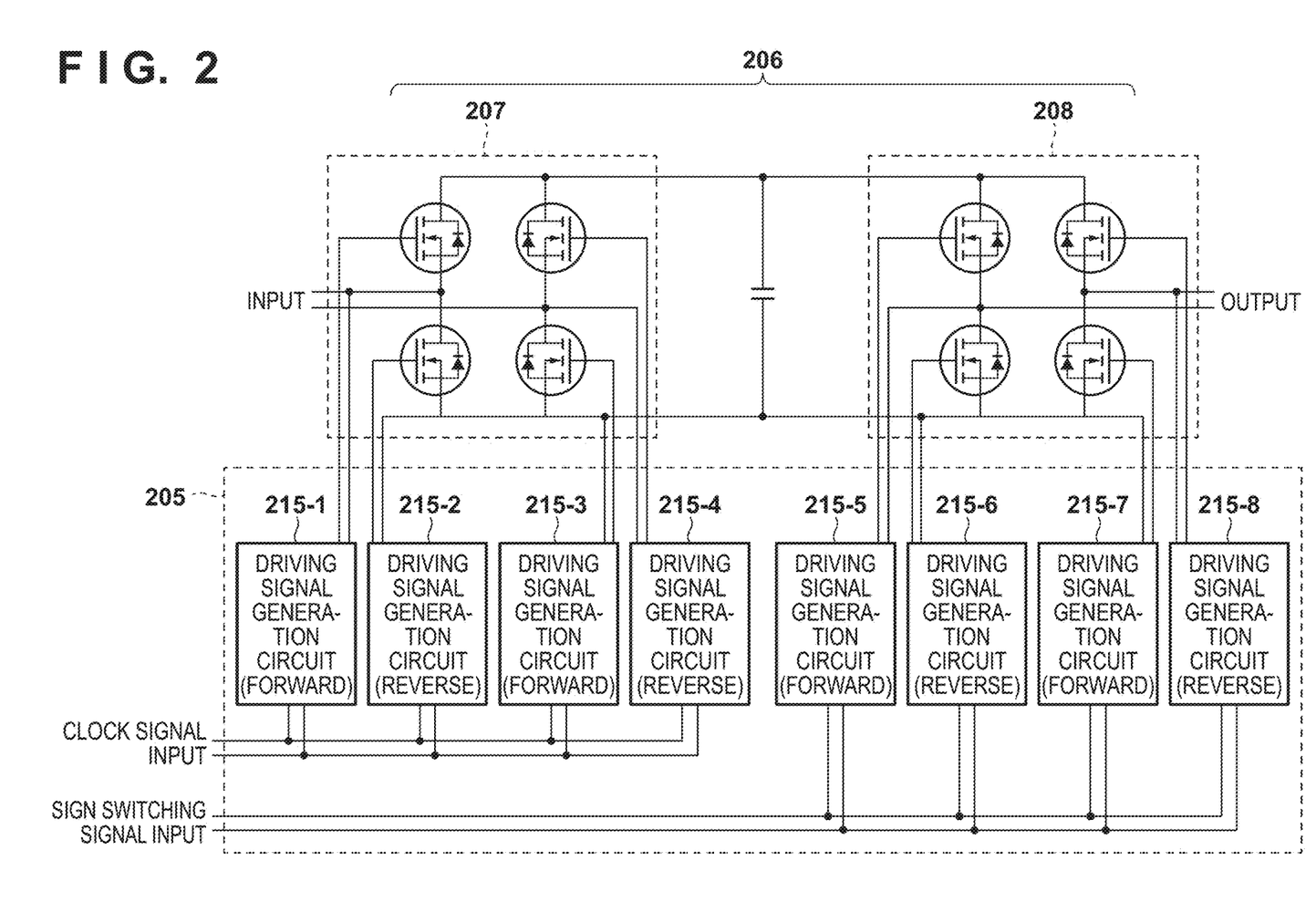
FIG. 2 is a diagram illustrating circuit configurations of a motor driving circuit and a gate driving circuit according to a first embodiment.

FIG. 2 is a diagram illustrating circuit configurations of a motor driving circuit and a gate driving circuit according to the first embodiment. It illustrates an example of detailed circuit configurations of the motor driving circuit 206 and the gate driving circuit 205 in the present embodiment. The motor driving circuit 206 includes the synchronous rectification circuit 207 and a sign switching circuit 208. The gate driving circuit 205 includes driving signal generation circuits 215-1 to 215-8. The synchronous rectification circuit 207 operates using gate driving signals generated by the driving signal generation circuits 215-1 to 215-4 based on the clock signal output from the receiving circuit 203. Specifically, the driving signal generation circuits 215-1 to 215-4 generate, as gate driving signals, source-gate voltages (signals) of switching elements of the synchronous rectification circuit 207. The source-gate voltages can be generated by insulating the receiving circuit 203 and the motor driving circuit 206 from one another or by using a bootstrap circuit. The switching elements of the synchronous rectification circuit 207 are turned on and off by the source-gate voltages. For example, the upper side of the output from the synchronous rectification circuit 207 would constantly have a positive potential by turning on the upper left and lower right switching elements of the synchronous rectification circuit 207 and turning off the lower left and upper right switching elements when the upper one of the two terminals of the clock signal input illustrated in FIG. 2 has a positive potential, and doing the reverse when the upper terminal of the clock signal input has a negative potential. With regard to the timings for performing this switching between on and off, it suffices to measure the zero-crossing timings of the output voltage waveform of the power receiving circuit 204 in advance, and to perform phase adjustment using the transmitting circuit 105 so that the phase of the clock signal matches the zero-crossing timings. It suffices to keep the phase shift amount fixed after the adjustment. In addition, if the zero-crossing timings fluctuate depending on the output voltage amplitude of the power source 104, rectification efficiency can be increased to a further extent by measuring the relationship between the output voltage amplitude and the phase shift amount in advance, and automatically correcting the phase shift amount in relation to the output voltage amplitude in the power transmitting-side circuit 100.

The sign switching circuit 208 is a circuit that selects whether to directly output the output voltage of the synchronous rectification circuit 207 as a positive voltage or to output the output voltage after switching the voltage to a negative voltage. The switching elements of the sign switching circuit 208 operate according to gate driving signals generated by the driving signal generation circuits 215-5 to 215-8 based on the sign switching signal output from the controller 103. Similarly to the synchronous rectification circuit 207, the driving signal generation circuits 215-5 to 215-8 generate, as gate driving signals, source-gate voltages (signals) of the switching elements of the sign switching circuit 208. Similarly to the synchronous rectification circuit 207, the source-gate voltages can be generated by insulating the receiving circuit 203 and the motor driving circuit 206 from one another or by using a bootstrap circuit. If a positive voltage is to be applied to the motor 400, it suffices for the controller 103 to transmit a sign switching signal that turns on the upper right and lower left switching elements of the sign switching circuit 208 and turns off the upper left and lower right switching elements.

Operation of Driving System 300 for Application of Negative Voltage to Motor

Next, an example of an operation of the driving system 300 for applying a negative voltage to the motor 400 will be described. The sign of the sign switching signal transmitted from the controller 103 to the transmitting circuit 105 is inverted, but otherwise the operation is the same as that for applying a positive voltage. If the sign of the sign switching signal is inverted, the switching elements of the sign switching circuit 208 that turn on and the switching elements that turn off switch with one another. Accordingly, the upper left and lower right switching elements of the sign switching circuit 208 turn on and the lower left and upper right switching elements turn off, and the sign of the motor application voltage is inverted.

As described above, the signals that control the motor driving circuit 206 include a clock signal with a fixed frequency and duty and a simple on/off signal that provides timings for switching the sign of the output voltage. Conventionally, a typical motor control signal is a pulse width modulation (PWM) signal, the amplitude of the voltage input to the motor driving circuit is fixed, and the amplitude and sign of the motor application voltage are changed by changing the pulse width of the control signal provided to the motor driving circuit. On the other hand, in the present embodiment, the amplitude of the motor application voltage is changed by the power source 104 of the power transmitting-side circuit 100. Thus, the power receiving-side circuit 200, the space for which is limited, does not need to change the amplitude of the motor application voltage, and a reduction in the size of the power receiving-side circuit 200 is realized.

Figure 3:
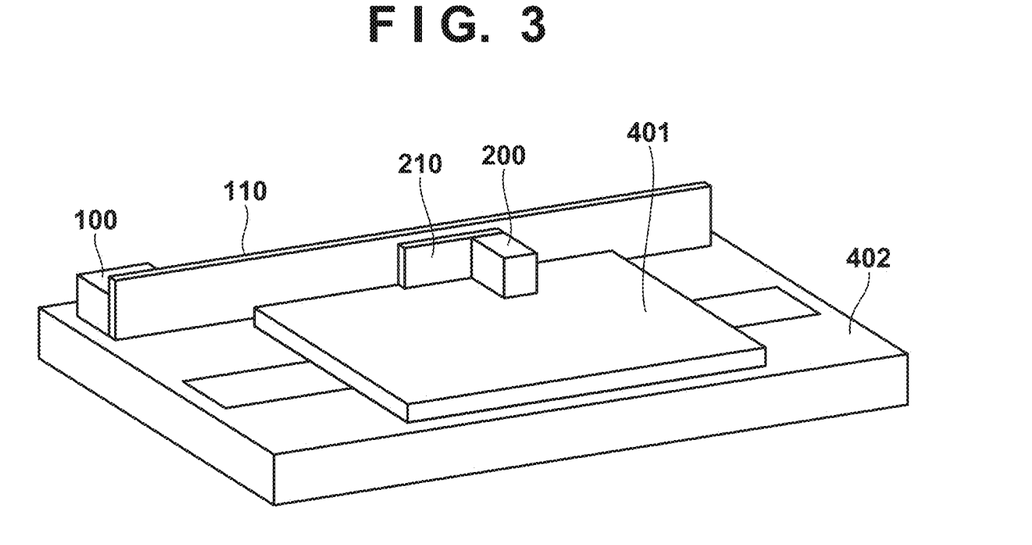
FIG. 3 is a schematic diagram illustrating an example in which the driving system is applied to a movable stage according to one embodiment.

FIG. 3 is a schematic diagram illustrating an example in which the driving system 300 is applied to a movable stage, for example, of a semiconductor exposure device, according to one embodiment. The power receiving-side circuit 200 is arranged on a movable stage 401, and moves physically relative to the power transmitting-side circuit 100. The power transmitting-side circuit 100 is not arranged on the movable stage 401, and instead, is arranged on the stationary side, in which a movable stage power source 402 that moves the movable stage 401 is arranged. The power transmitting-side circuit 100 itself does not move.

A power transmitter 110 and a power receiver 210 for wireless power supply and communication are present between the power transmitting-side circuit 100 and the power receiving-side circuit 200. The power transmitting coil 101 and the transmitting coupler 102 are mounted on the power transmitter 110, and the power receiving coil 201 and the receiving coupler 202 are mounted on the power receiver 210. The power transmitter 110 and the power receiver 210 are not in contact with one another. The power receiver 210 is also arranged on the movable stage 401, and moves along with the movable stage 401. For example, the power transmitter 110 is longer than the power receiver 210, and the power receiver 210 is configured to be capable of uniaxially moving in the direction along which the power transmitter HO is longer than the power receiver 210. By making the power transmitter 110 long enough to cover the movement range of the movable stage 401 in such a manner, power can be supplied to the motor in a contactless manner regardless of the position to which the movable stage 401 moves. Note that the arrangement of the power transmitter 110 and the power receiver 210 is not limited to that illustrated in FIG. 3, and the power receiver 210 may be configured to be longer than the power transmitter 110. In addition, the power transmitter 110 may move relative to the power receiver 210, or the power transmitter 110 and the power receiver 210 may both move relative to one another along a predetermined direction. In order to allow the power transmitter 110 to move, the power transmitter 110 may be installed on a different movable stage.

The power transmitting coil 101 has the shape of an elliptical coil that is longer sideways, for example, and the power receiving coil 201 is a coil that is shorter than the power transmitting coil 101. The power receiving coil 201 may be long and the power transmitting coil 101 may be short. The transmitting coupler 102 is constituted by long differential signal wires arranged on a printed circuit board, for example, and the clock signal is input from ends thereof on one side, and the ends thereof on the other side are terminated. The receiving coupler 202 is constituted by short differential signal wires arranged on a printed circuit board, for example. The differential signal wires are connected to differential inputs of the receiving circuit 203. Signals are transmitted via the differential signal wires of the transmitting coupler 102 and the receiving coupler 202 facing one another and electromagnetically coupling with one another. The receiving coupler 202 may be long and the transmitting coupler 102 may be short.

Figure 4:
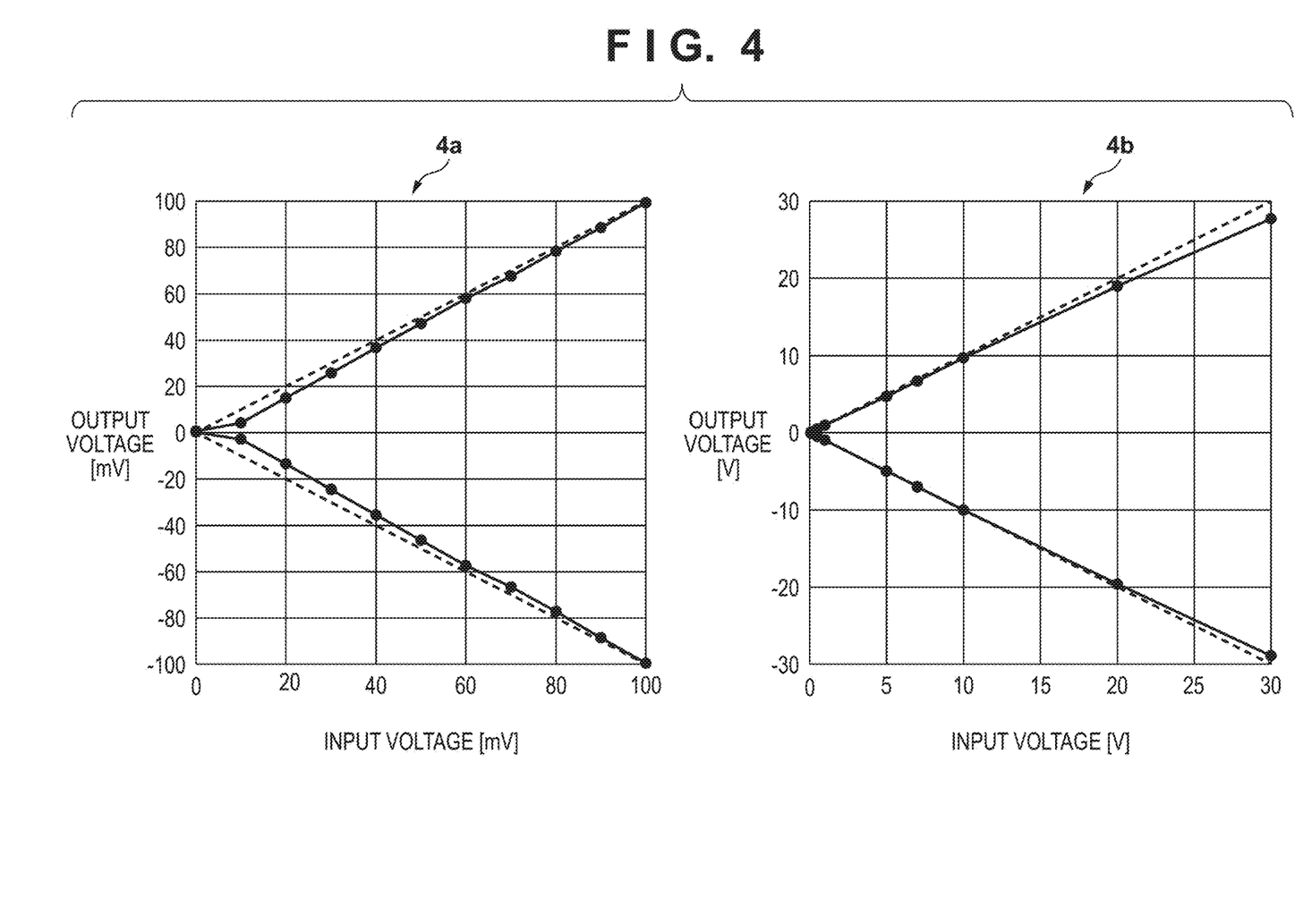
FIG. 4 shows measurement results of input/output characteristics of the driving system according to the first embodiment.

FIG. 4 shows measurement results of input/output characteristics of the driving system according to the first embodiment. FIG. 4 shows measurement results (solid lines) of input/output characteristics obtained by measuring application voltages applied to the motor 400 relative to output voltages of the power source 104. In the graphs 4a and 4b, the horizontal axis indicates output voltages of the power source 104, i.e., input voltages, and the vertical axis indicates application voltages applied to the motor 400, i.e., output voltages. Both positive and negative voltages are measured by reversing the sign switching signal. In addition, an ideal curve (broken line) corresponding to the case in which the input and output match is also illustrated in the graphs. The switching frequency is 4 MHz, and a 3 mH inductor is connected as a dummy load in place of a motor. It can be seen from the graph 4b that any voltage from 0 V to 30 V can be wirelessly supplied. While there are parts where the output voltage is lower than the ideal curve, the output voltage can be made closer to the ideal curve by correcting the command value of the output voltage amplitude from the controller 103 to the power source 104 so as to increase the power source output voltage by the amount by which the output voltage is lower than the ideal curve, based on the graphs 4a and 4b.

The first embodiment has been described above. According to various embodiments of the above described first embodiment, an increase in the speed of motor control is realized by transmitting a motor driving signal to the movable side in a contactless manner using electromagnetic coupling. Furthermore, a high-speed clock signal can also be transmitted to a synchronous rectification circuit with little delay. Thus, a detection circuit and a feedback control circuit become unnecessary on the movable side, and a reduction in the size and weight of the movable-side circuit is realized.

Second Embodiment

Figure 5:
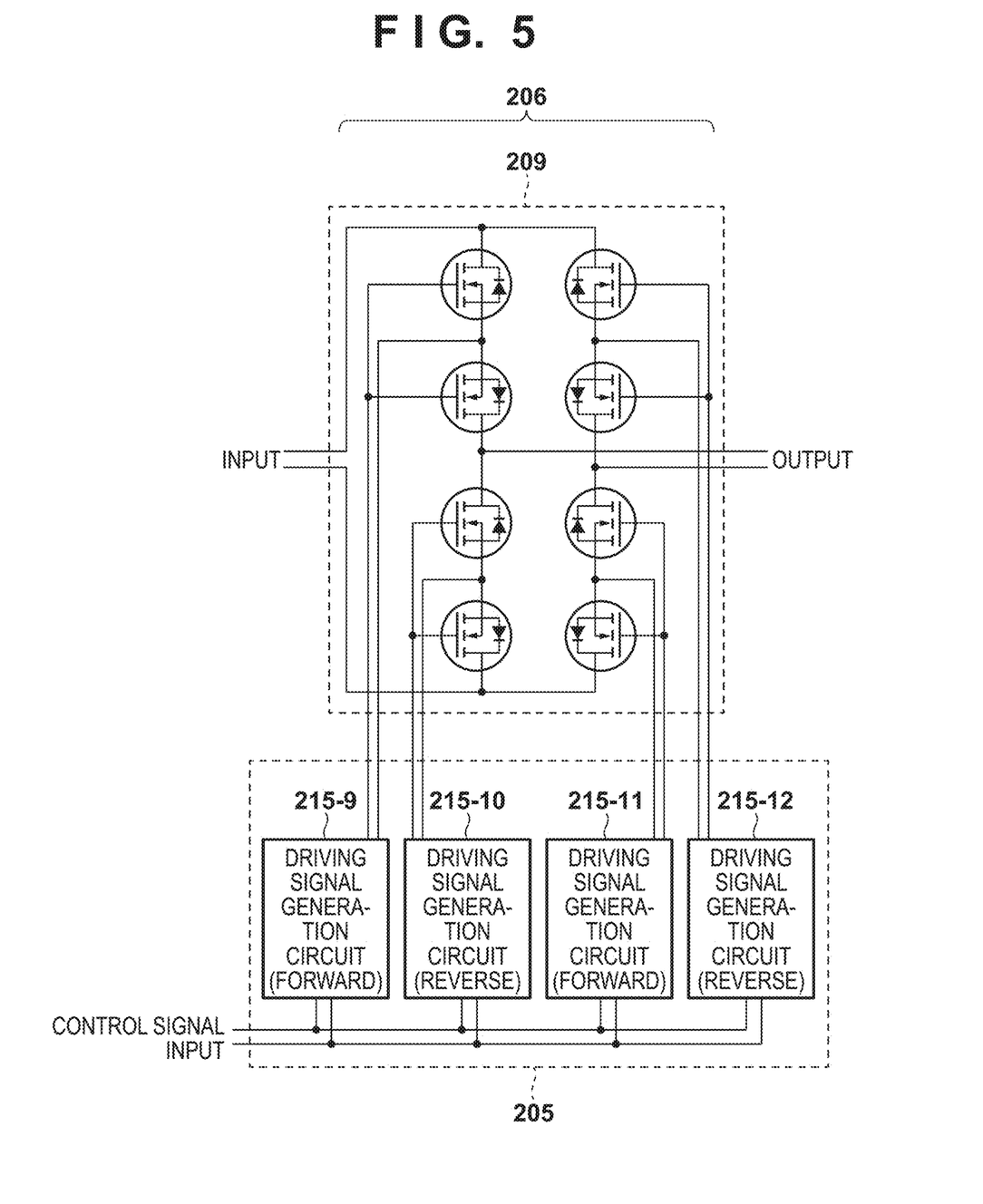
FIG. 5 is a diagram illustrating circuit configurations of the motor driving circuit and the gate driving circuit according to a second embodiment.

Next, the driving system 300 in the second embodiment will be described. Differences from the first embodiment will be described in the following description. Redundant description thereof has been omitted where appropriate. FIG. 5 is a diagram illustrating circuit configurations of the motor driving circuit and the gate driving circuit according to a second embodiment. FIG. 5 illustrates an example of detailed circuit configurations of the motor driving circuit 206 and the gate driving circuit 205 in the present embodiment. In the first embodiment, the synchronous rectification circuit 207 and the sign switching circuit 208 are configured to be separate. However, in the present second embodiment, the synchronous rectification circuit 207 and the sign switching circuit 208 are combined into a combined circuit (synchronous rectification/sign switching circuit 209). Due to this factor, the scale of the gate driving circuit 205 is halved, and a further reduction in circuit size is realized.

The switching elements of the synchronous rectification/sign switching circuit 209 operate using gate driving signals generated by driving signal generation circuits 215-9 to 215-12. The driving signal generation circuits 215-9 to 215-12 generate, as gate driving signals, source-gate voltages (signals) of the switching elements of the synchronous rectification/sign switching circuit 209. Similarly to the first embodiment, the source-gate voltages are generated by insulating the receiving circuit 203 and the motor driving circuit 206 from one another or by using a bootstrap circuit.

The switching elements are arranged in the form of bidirectional switches in which there are two switching elements per driving signal generation circuit (any one of the driving signal generation circuits 215-9 to 215-12). The reason for this is because an AC voltage enters from the input, and thus, if there was only one switching element, the body diode would turn on when the sign is inverted and the gate driving circuit 205 would not be able to perform on/off control.

In addition, in order to perform synchronous rectification and sign switching simultaneously using a single circuit, the control signal that is input to the gate driving circuit 205 is a signal in which the clock signal and the sign switching signal are combined. In the first embodiment, the clock signal and the sign switching signal are separate signals, and thus, two pairs of the transmitting coupler 102 and the receiving coupler 202 are necessary, one for the clock signal and the other for the sign switching signal. On the other hand, in the present embodiment, one pair of the transmitting coupler 102 and the receiving coupler 202 suffices, and the size of the power transmitter 110 and the power receiver 210 can be reduced.

Next, the operation of the synchronous rectification/sign switching circuit 209 will be described. During the application of a positive voltage to the motor 400 (during the output of a positive voltage), it suffices to turn on the upper left and lower right bidirectional switches of the synchronous rectification/sign switching circuit 209 and turn off the lower left and upper right bidirectional switches when the upper one of the two terminals of the input has a positive potential, and to switch to the reverse when the upper one of the two terminals of the input switches to having a negative potential. Similarly to the first embodiment, this is realized by providing gate driving signals synchronized with the switching clock of the SW circuit 106. Here, if the switching elements were not in the form of bidirectional switches, the body diode would turn on at the point in time when the upper one of the two terminals of the input switches to having a negative potential, and it would be impossible to perform synchronous rectification.

Furthermore, when applying a negative voltage to the motor 400 (when switching the output to a negative voltage), it suffices to invert the synchronized gate driving signals. That is, it suffices to turn on the lower left and upper right bidirectional switches of the synchronous rectification/sign switching circuit 209 and turn off the upper left and lower right bidirectional switches when the upper one of the two terminals of the input has a positive potential, and to switch to the reverse when the upper one of the two terminals of the input switches to having a negative potential. The control signal input to the gate driving circuit 205 can realize synchronous rectification and sign switching using a single circuit if the above-described conditions are satisfied.

It suffices to generate such a control signal using the transmitting circuit 105. The above-described conditions are satisfied if the clock signal input from the SW circuit 106 and the sign switching signal input from the controller 103 are synthesized by exclusive ORing, for example. The clock signal is directly transmitted when the sign switching signal is "0", and the clock signal is transmitted in an inverted state if the sign switching signal is "1". The other parts are the same as those in the first embodiment.

Synchronous rectification and sign switching can be realized using a single circuit in such a manner because the signals that control the motor driving circuit 206 include a clock signal having a fixed frequency and duty and a simple on/off signal that provides timings for switching the sign of the output voltage, as described above. The typical motor control signal disclosed in the prior art is a PWM signal, which is of a completely different waveform from the clock signal for synchronous rectification. For this reason, the synchronous rectification circuit cannot be controlled and the scale of the gate driving circuit cannot be reduced with a PWM signal, and thus the reduction in size realized by various embodiments of the present disclosure cannot be realized with a PWM signal.

Figure 6:
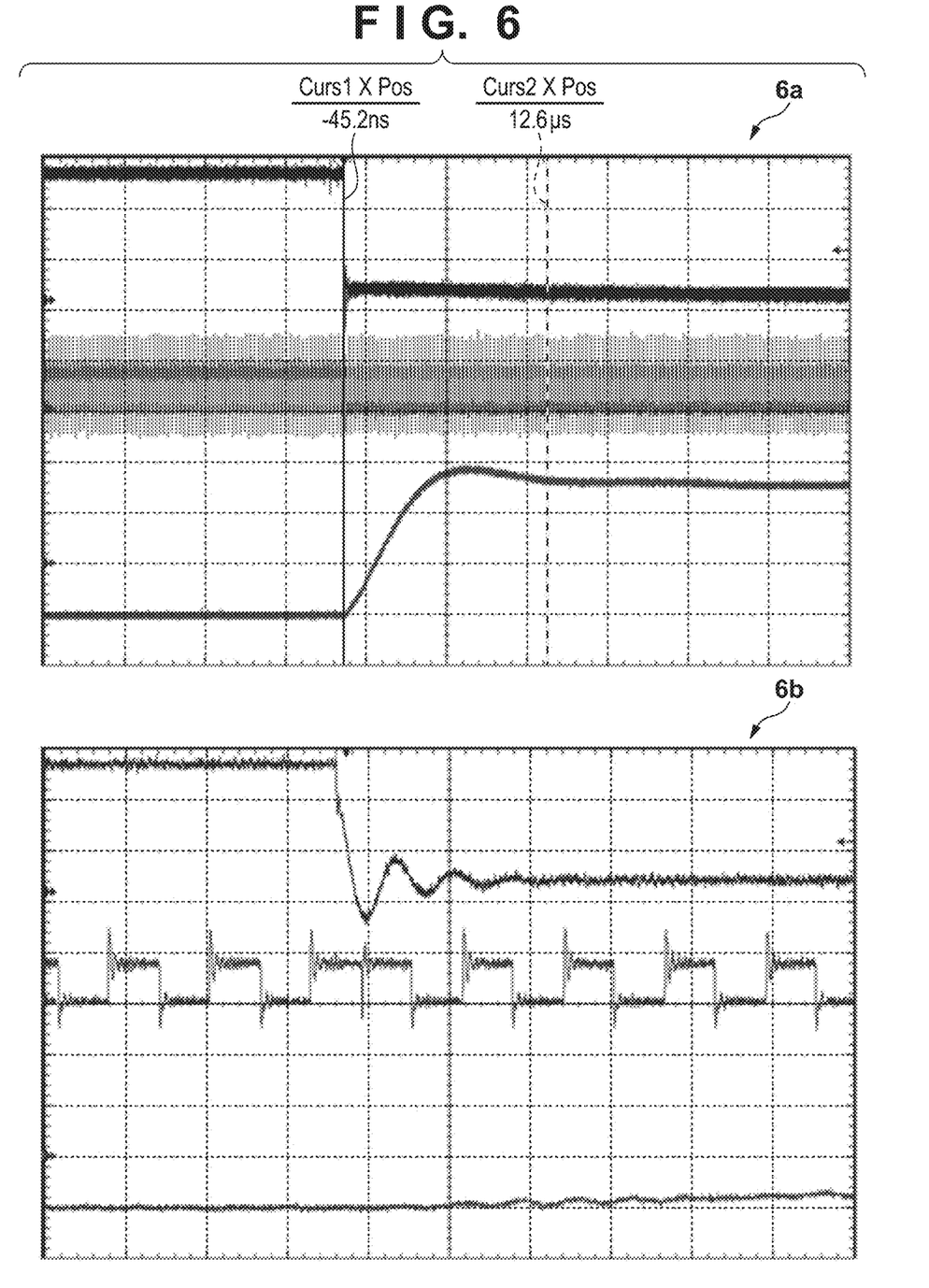
FIG. 6 shows actually-measured results of operation waveforms of the driving circuits according to the second embodiment.

FIG. 6 shows actually-measured results of operation waveforms of the driving circuits according to the second embodiment. In FIG. 6, the waveforms 6a show actually-measured waveforms indicating the relationship between the sign switching signal output by the controller 103, the control signal input to the gate driving circuit 205, and the application voltage applied to the motor 400, and the waveforms 6b show enlarged waveforms of the waveforms 6a. The horizontal axis indicates time, and the waveforms 6a and the waveforms 6b respectively correspond to 5 μs/div and 200 ns/div. The waveforms 6a and 6b both show the sign switching signal waveform, the control signal waveform, and the application voltage waveform in order from the top. The vertical axis indicates voltage, and the sign switching signal, the control signal, and the application voltage are indicated in 2 V/div, 4 V/div, and 2 V/div, respectively. The application voltage waveform is a negative voltage before it rises and a positive voltage after it rises. The switching frequency is 4 MHz, and a 3 mH inductor is connected as a dummy load in place of a motor.

From FIG. 6, it can be seen that, when the sign switching signal switches from "1" to "0", the control signal input to the gate driving circuit 205 is inverted, i.e., the phase of the waveform of the synthesized signal synthesized from the clock signal and the sign switching signal is inverted, and the application voltage waveform switches from a negative voltage to a positive voltage. While it takes about 10 μs to switch from a negative voltage to a positive voltage, the time constant defined by an output capacitor and an inductor of the dummy load is related to this, and speed can be further increased by making the output capacitor smaller.

In addition, it can be confirmed from FIG. 6 that the delay time from the timing when the sign switching signal switches from "1" to "0" until when the phase of the control signal waveform input to the gate driving circuit 205 is inverted is equal to or shorter than 100 ns. That is, motor operation can be controlled at a cycle equal to or shorter than 100 ns. This is because the control signal is transmitted between the transmitting coupler 102 and the receiving coupler 202 via electromagnetic coupling with a delay of only several ns, and motor operation cannot be controlled at such a short cycle if wireless communication utilizing electromagnetic waves is used as in the conventional technique. In addition, a clock signal that switches at a higher speed than motor control cannot be transmitted with little delay, and thus, a synthesized signal synthesized from a clock signal and a sign switching signal cannot be transmitted. That is, in a case in which wireless communication utilizing electromagnetic waves is used, the size of the gate driving circuit 205 cannot be reduced by combining the synchronous rectification circuit 207 and the sign switching circuit 208 as in the present embodiment. An increase in the speed of motor control and a reduction in the size and weight of a circuit arranged on the movable side are realized by transmitting a control signal via electromagnetic coupling as in the present embodiment.

Note that, while the synchronous rectification/sign switching circuit 209 in FIG. 5 is described as a full bridge-type circuit, the synchronous rectification/sign switching circuit 209 may be a center tap-type circuit. In such a case, wiring becomes complex because the power receiving coil 201 would need to be configured into a center tap-type coil. However, the number of switching elements in the synchronous rectification/sign switching circuit 209 can be reduced to four.

Modifications

In the above-described embodiments, a case in which the transmitting coupler 102 and the receiving coupler 202 are coupled by electromagnetic coupling is described. However, in other embodiments, the transmitting coupler 102 and the receiving coupler 202 may be coupled by optical coupling. It suffices to arrange a laser or a light-emitting diode with sharp directivity on the stationary side and make the laser or light-emitting diode emit light along the movement direction of the stage, and to arrange a light-receiving element such as a photodiode on the movable side so that the light-receiving surface is positioned on the optical path of the emitted light, for example. While optical coupling also enables transmission to be performed with less delay compared to wireless communication utilizing electromagnetic waves, there is a delay that is dependent on the frequency characteristics of the light-emitting element and the light-receiving element when compared to electromagnetic coupling.

Also, the power for causing the receiving circuit 203 and the gate driving circuit 205 to operate may be generated from the motor application voltage using a buck-boost circuit, etc., or a power transmitting coil and a power receiving coil may be separately provided, for example.

Also, the power transmitting coil 101 and the power receiving coil 201 may be formed by wires on the printed circuit boards. Furthermore, magnetic sheets may be affixed onto the printed circuit boards to reduce loss during electromagnetic coupling. In addition, the power transmitting coil 101 and the power receiving coil 201 may be a wire-wound transformer in which a magnetic body of ferrite, etc., and a winding of a litz wire, etc., are used, for example.

Also, in a case in which the absolute value of the minimum voltage to be applied to the motor 400 is equal to or greater than several hundreds of mV and can be rectified with a diode, the synchronous rectification circuit 207 may be a rectification circuit in which a diode is used. In such a case, gate driving of the synchronous rectification circuit 207 is unnecessary, and the size of the power receiving-side circuit 200 can be reduced.

According to the above-described embodiments, the speed of wireless communication of control signals for driving a load portion can be increased. The invention is not limited to the above-described embodiments, and various changes and modifications are possible in other embodiments of the present disclosure.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-097072, filed May 23, 2019, which is hereby incorporated by reference herein in its entirety.

What is claimed is:

1. A control system comprising:
    a power transmitting coil for wirelessly transmitting power supplied from a power source;
    a converter circuit that converts a direct current (DC) voltage output from the power source into an alternating current (AC) voltage using a clock signal, and applies the AC voltage to the power transmitting coil,
    a power receiving coil for wirelessly receiving power by electromagnetic coupling between the power transmitting coil and the power receiving coil;
    a driving circuit configured to drive a load portion using the power received via the power receiving coil, the driving circuit including a combined circuit in which a synchronous rectification circuit that receives a voltage output from the power receiving coil as an input voltage and a sign switching circuit that switches a sign of a voltage output from the synchronous rectification circuit are combined, the combined circuit including a plurality of switch elements arranged in a form of bidirectional switches, and the combined circuit being able to output both a positive voltage and a negative voltage;
    a transmitting coupler for wirelessly transmitting a transmission signal for controlling the load portion;
    a receiving coupler for wirelessly receiving the transmission signal by electromagnetic coupling between the transmitting coupler and the receiving coupler; and
    a generation circuit configured to generate a driving signal for controlling the combined circuit from the clock signal and a signal for sign switching, which are obtained based on the transmission signal received via the receiving coupler,
    wherein the transmission signal is a signal synthesized by exclusive ORing the signal for sign switching and the clock signal.

2. The control system according to claim 1,
    wherein the control system includes a power transmitter and a power receiver,
    the power transmitter includes the power transmitting coil and the transmitting coupler, and
    the power receiver includes the power receiving coil and the receiving coupler.

3. The control system according to claim 2, further comprising a movable stage that relatively moves at least one of the power transmitter and the power receiver along a predetermined direction.

4. The control system according to claim 1, wherein the clock signal is generated by the converter circuit.

5. The control system according to claim 1, wherein the combined circuit is configured as a full bridge-type circuit in which the plurality of switch elements are used.

6. The control system according to claim 1, wherein the combined circuit is configured as a center tap-type circuit in which a plurality of switch elements are used.

7. The control system according to claim 1, wherein wireless communication between the transmitting coupler and the receiving coupler is performed in accordance with a baseband method.

8. The control system according to claim 1, wherein the driving circuit includes four switch elements arranged in the form of bidirectional switches.

9. The control system according to claim 1, wherein the load portion is a motor.

10. A control system comprising:
    a power transmitting coil for wirelessly transmitting power supplied from a power source;
    a converter circuit that converts a direct current (DC) voltage output from the power source into an alternating current (AC) voltage using a clock signal, and applies the AC voltage to the power transmitting coil,
    a power receiving coil for wirelessly receiving power by electromagnetic coupling between the power transmitting coil and the power receiving coil;
    a driving circuit configured to drive a load portion using the power received via the power receiving coil, the driving circuit including a combined circuit in which a synchronous rectification circuit that receives a voltage output from the power receiving coil as an input voltage and a sign switching circuit that switches a sign of a voltage output from the synchronous rectification circuit are combined, the combined circuit including a plurality of switch elements arranged in a form of bidirectional switches, and the combined circuit being able to output both a positive voltage and a negative voltage;
    a transmitting coupler for wirelessly transmitting a transmission signal for controlling driving of the load portion;
    a receiving coupler for wirelessly receiving the transmission signal by optical coupling between the transmitting coupler and the receiving coupler; and
    a generation circuit configured to generate a driving signal for controlling the combined circuit from the clock signal and a signal for sign switching, which are included in the transmission signal received via the receiving coupler,
    wherein the transmission signal is a signal synthesized by exclusive ORing the signal for sign switching and the clock signal.

11. A control method for a control system including a power transmitting coil, a power receiving coil, a transmitting coupler, a receiving coupler, and a load portion, the control method comprising:
    wirelessly transmitting power supplied from a power source via electromagnetic coupling between the power transmitting coil and the power receiving coil;
    converting a direct current (DC) voltage output from the power source into an alternating current (AC) voltage using a clock signal, and applying the AC voltage to the power transmitting coil,
    wirelessly transmitting a transmission signal for controlling driving of the load portion via electromagnetic coupling between the transmitting coupler and the receiving coupler; and
    generating, from the clock signal and a signal for sign switching, which are obtained based on the transmission signal received via the receiving coupler, a driving signal for controlling a driving circuit that drives the load portion using the power received via the power receiving coil, the driving circuit including a combined circuit in which a synchronous rectification circuit that receives a voltage output from the power receiving coil as an input voltage and a sign switching circuit that switches a sign of a voltage output from the synchronous rectification circuit are combined, the combined circuit including a plurality of switch elements arranged in a form of bidirectional switches, and the combined circuit being able to output both a positive voltage and a negative voltage, wherein the transmission signal is a signal synthesized by exclusive ORing the signal for sign switching and the clock signal.

12. The control method according to claim 11 further comprising
relatively moving at least one of a power transmitter and a power receiver that are included in the control system along a predetermined direction,
wherein the power transmitter includes the power transmitting coil and the transmitting coupler, and
wherein the power receiver includes the power receiving coil and the receiving coupler.

\* \* \* \* \*